US007389539B1

United States Patent
Kouznetsov (10) Patent No.: US 7,389,539 B1
(45) Date of Patent: *Jun. 17, 2008

(54) ANTI-INTRUSION SOFTWARE UPDATING SYSTEM AND METHOD

(75) Inventor: Victor Kouznetsov, Aloha, OR (US)

(73) Assignee: McAfee, Inc., Santa Clara, CA (US)

( * ) Notice: Subject to any disclaimer, the term of this patent is extended or adjusted under 35 U.S.C. 154(b) by 618 days.

This patent is subject to a terminal disclaimer.

(21) Appl. No.: 10/756,690

(22) Filed: Jan. 12, 2004

Related U.S. Application Data (63) Continuation of application No. 09/267,329, filed on Mar. 12, 1999, now Pat. No. 6,725,377.

(51) Int. Cl.
*G06F 11/30* (2006.01)
*G06F 12/14* (2006.01)
(52) U.S. Cl. .......................................... 726/22; 713/188
(58) Field of Classification Search ................. 726/13, 726/22–23, 26, 2; 713/154, 163, 188
See application file for complete search history.

(56) References Cited

U.S. PATENT DOCUMENTS 5,623,600 A * 4/1997 Ji et al. ......................... 726/24
5,832,208 A * 11/1998 Chen et al. .................... 726/24
6,123,737 A * 9/2000 Sadowsky ................... 717/173
6,298,445 B1 * 10/2001 Shostack et al. .............. 726/25

OTHER PUBLICATIONS

Push Technology House Backweb Acquires Lanacom, Jul. 9, 1997, Computergram Internation, n3199.*
Barry Nance, 1998, Network Computing, n 904, p. 52.*
Active Desktop Alienates Push Clients, Sep. 1997, Internet Business Report.*

* cited by examiner

*Primary Examiner*—Gilberto Barron, Jr.
*Assistant Examiner*—Jenise E Jackson
(74) *Attorney, Agent, or Firm*—Zilka-Kotab, PC; Christopher J. Hamaty (57) ABSTRACT

A method and system for updating anti-intrusion software is provided. In a preferred embodiment, a computer program product updates anti-intrusion software on a computer network which has an anti-intrusion monitor server. The anti-intrusion monitor server recognizes attacks on the computer network in accordance with attack pattern information contained in the anti-intrusion software. The computer program product includes computer code that installs modified attack pattern information onto a central anti-intrusion server, and computer code that transfers the modified attack pattern information from the central anti-intrusion server to the anti-intrusion monitor server using push technology. The result is that newly discovered attack patterns are capable of being rapidly communicated from the central anti-intrusion server to the computer network.

22 Claims, 7 Drawing Sheets

ANTI-INTRUSION SOFTWARE UPDATING SYSTEM AND METHOD

This is a continuation of application Ser. No. 09/267,329, filed on Mar. 12, 1999, now U.S. Pat. No. 6,725,377.

FIELD OF THE INVENTION

The present invention relates to computer systems and computer networks. In particular, the present invention relates to a computer program product and method that modifies anti-intrusion software on a computer network.

BACKGROUND OF THE INVENTION

The subject matter of the present application is related to "Method and System for Providing Automated Updating and Upgrading of Antivirus Applications Using a Computer Network" (application Ser. No. 09/001,611), the contents of which are hereby incorporated by reference, assigned to the assignee of the present invention.

Intrusion attacks on computer networks are a major problems in today's networked computing environment. An intrusion attack occurs when an intruder either breaches a network or temporarily disables it. As far back as 1992, the Federal Bureau of Investigation had determined that computer crime is the most expensive form of commercial crime—with an average cost of $450,000 per theft. Estimates of the total dollar figure for computer theft are as high as $5 billion per year.

Intrusion attacks are generally given a name, typically reflecting the characteristics of the attack. For example, a "Ping of Death" intrusion attack occurs when an intruder sends abnormally large ping packets in an attempt to disable a remote system. A "ping" checks whether a remote host is active on a network by sending it packets. The remote host then echos back those packets to the user's machine. If the remote host does not echo back the packets, the remote host is considered down and the ping sender is so notified. If a large number of ping packets are sent to a remote host at one time, this can cause an abrupt failure of the core part of the operating system, potentially causing data to be lost due to improper system shutdown.

Another type of attack is called the "SYN Flood" attack. With this type of intrusion attack, an intruder attempts to establish a connection with a service; however, the client does not allow the connection to be completed. The service continues to send confirmations to the client in an attempt to complete the connection. The connection queues fill up, and service is denied to legitimate users.

A variety of programs have been developed to detect and intercept intrusion attacks on networks. By monitoring the traffic on a network, or the traffic at the gateway of a local area network, these "monitors" can alert a system administrator when a virus is detected. A monitor is typically implemented by an anti-intrusion software program on a server attached to the network. By server, what is meant is any type of computer on which the software program is loaded. This server, hereinafter referred to as an "anti-intrusion monitor server," examines packets that pass on the network and looks for characteristics of known attacks. When an anti-intrusion monitor server detects characteristics of a known intrusion attack, a system administrator is typically notified.

Other actions, while not strictly attacks, indicate malicious intent and often precede an attack. Examples include information gathering probes and connection attempts. An anti-intrusion monitor server will also watch for this type of malicious activity, often a precursor to an attack.

In order to detect intrusion attacks, the anti-intrusion software of a monitor server typically includes an intrusion attack scanning engine with one or more files known as "attack signature files," which contain information pertaining to known types of intrusion attacks. This information includes both the type of protocol the attack occurs in (e.g., Transmission Control Protocol/Internet Protocol [TCP/IP] or File Transfer Protocol [FTP]) and specific packet information which is indicative of an attack. Importantly, the anti-intrusion software is only able to detect those types of intrusion attacks for which it has a corresponding attack signature files. If a new type of intrusion attack is developed, the anti-intrusion monitor server will be unable to detect it.

By way of example, and not by way of limitation, a leading anti-intrusion attack program and its accompanying attack profiles will be described. It is emphasized that this example is presented only for clarity of presentation, and does not limit the scope or context of the preferred embodiments to certain software packages, software types, or operating system types. Indeed, the preferred embodiments are advantageously applied to many different types of anti-intrusion software programs on many different types of operating systems and computer configurations.

A leading anti-intrusion application, produced by Network Associates, is called CyberCop Network. CyberCop Network is a real-time intrusion detection system, performing round-the-clock surveillance of network traffic. Acting as a hi-tech burglar alarm, CyberCop Network helps protect a network from attacks—both internal and external—by sending out alerts when the security of the network is breached by unauthorized intruders. CyberCop Network is a software application offered in a variety of outlets and forms. It is accompanied by documentation, including the "CyberCop Network for Windows NT v2.0 User's Guide," issued October 1998. The contents of these documents are hereby incorporated by reference into the present application.

In one form, CyberCop Network is adapted to run on one or several Windows NT-based servers connected to a network. For optimum security, each CyberCop Network server should be installed on a dedicated machine before any point of entry to the network or network segments. This would include at the same network segment as the web server, at the Ethernet interface just inside the firewall, or between the Internet router and the internal machines.

If CyberCop Network does run on multiple servers, all servers running CyberCop Network can be configured at a single monitor server running CyberCop Network Configuration Manager, a configuration tool. CyberCop Network Configuration Manager can remotely configure all networked servers running a local copy of CyberCop Network.

CyberCop Network Configuration Manager uses Windows' "drag-and-drop" feature to create and distribute monitoring profiles for attacks. A "profile" includes the following three attributes: 1) one or more attack signatures with detection thresholds; 2) one or more monitoring schedules; and 3) one or more attack notification methods. Profiles are distributed from the Configuration Manager to the networked servers directing them to perform remote monitoring functions using their local copies of CyberCop Network.

To create a monitoring profile, a user first chooses which networked server (or servers) the profile will operate on, and selects that server. The user then has the choice of which attack signature files to include in the profile. The "master attack list" includes approximately 180 known attacks, sorted into protocol attack groups by the protocol they occur in, e.g. TCP/IP, FTP, or WWW. Each attack signature file also includes a corresponding description of the attack that the user can read. The user can import the entire master attack list, an entire protocol attack group, or individual attack signatures that the user can pick and choose. Next, the user must set the threshold of detection sensitivity by specifying the number of times within a specified number of seconds/minutes that an attack must occur before an alert is generated. CyberCop Network will perform specific operations when an alert is generated, in accordance with the Alert Manager's settings as configured by the user, explained below. Detection sensitivity can be set for each individual attack signature or collectively for an entire attack group.

The user has the option of setting a monitoring schedule for each attack signature or group. The monitoring schedule allows the user to set the time period for each day of a week that CyberCop Network will monitor for the attack signature or group. Scheduling allows a user to minimize the inconvenience caused by false alarms. For example, a user may want to turn off detection during periods of peak traffic, and turn on detection after hours. If a monitoring schedule isn't set, the default schedule enables detection at all times.

CyberCop Network logs events, i.e. suspected attacks or malicious activities, based on analysis of network traffic, and then sends alerts based on those events. The user can set "exclusions" for each individual attack signature or collectively for an entire attack group, which allow the user to filter out events that would otherwise issue as an alert. The user can set exclusions based on traffic from specific sources or to specific destinations. For example, a user could set one node on a network to be monitored for ping of death attacks, and then exclude the monitoring of all other nodes for this type of intrusion attack.

To distribute profiles amongst multiple servers, a user need merely drag and drop the profile to all networked servers which the user wishes to have monitor the specific settings of the profile.

Finally, the user must configure the "Alert Manager." Alerts can be forwarded to other networked computers running CyberCop Network so as to consolidate the alert messages on a designated server. The user may specify up to nine operations CyberCop Network will perform when it generates an alert, including: 1) sending an alert as a network message; 2) sending an alert as an STMP e-mail message; 3) sending an alert to a pager; 4) sending an alert to a network printer; 5) sending an alert as an SNMP network message; 6) sending an alert to a DMI console; 7) launching a program on alert; 8) sending an alert as an audible .WAV file; or 9) logging the alerts to the Windows NT Application Event Log.

Users can drag and drop, or cut and paste, elements from any profile to any other profile to reorganize or populate a profile.

A limitation of CyberCop Network is that the user is limited to the 180 or so attack signature files supplied with the software to assemble monitoring profiles. These attack signature files are based on known attacks only. However, as is true with computer viruses, the types of attacks are always evolving. "Crackers," or hackers with malicious intent, are limited only by their creativity as personal computers become more and more powerful and networks become more and more prevalent.

It has been found that as soon as a new type of attack is discovered, knowledge of its existence is quickly disseminated over the Internet at security clearinghouse web sites, such as "http://www.rootshell.com." Anti-intrusion software manufacturers may also monitor the flow of information of newly discovered attacks, and can quickly design attack signature files to detect and therefore prevent new types of attacks.

While the creation of an attack signature file for a newly discovered attack is helpful, it is necessary that it reach the CyberCop Network user. Updates are commonly sent out on a physical data medium such as a CD-ROM or floppy disk to customers. Alternatively, users can access Network Associates' website at "http://www.nai.com" and download updated attack signature files. However, in the modern environment of the overburdened system administrator who is typically kept busy addressing present network failures, obtaining and installing merely preventative attack signature files may take a low priority. The result of an outdated network security system may have no immediate impact, but if a "cracker" gets through on an intrusion attack, the results can be disproportionately disastrous.

Figure 1:
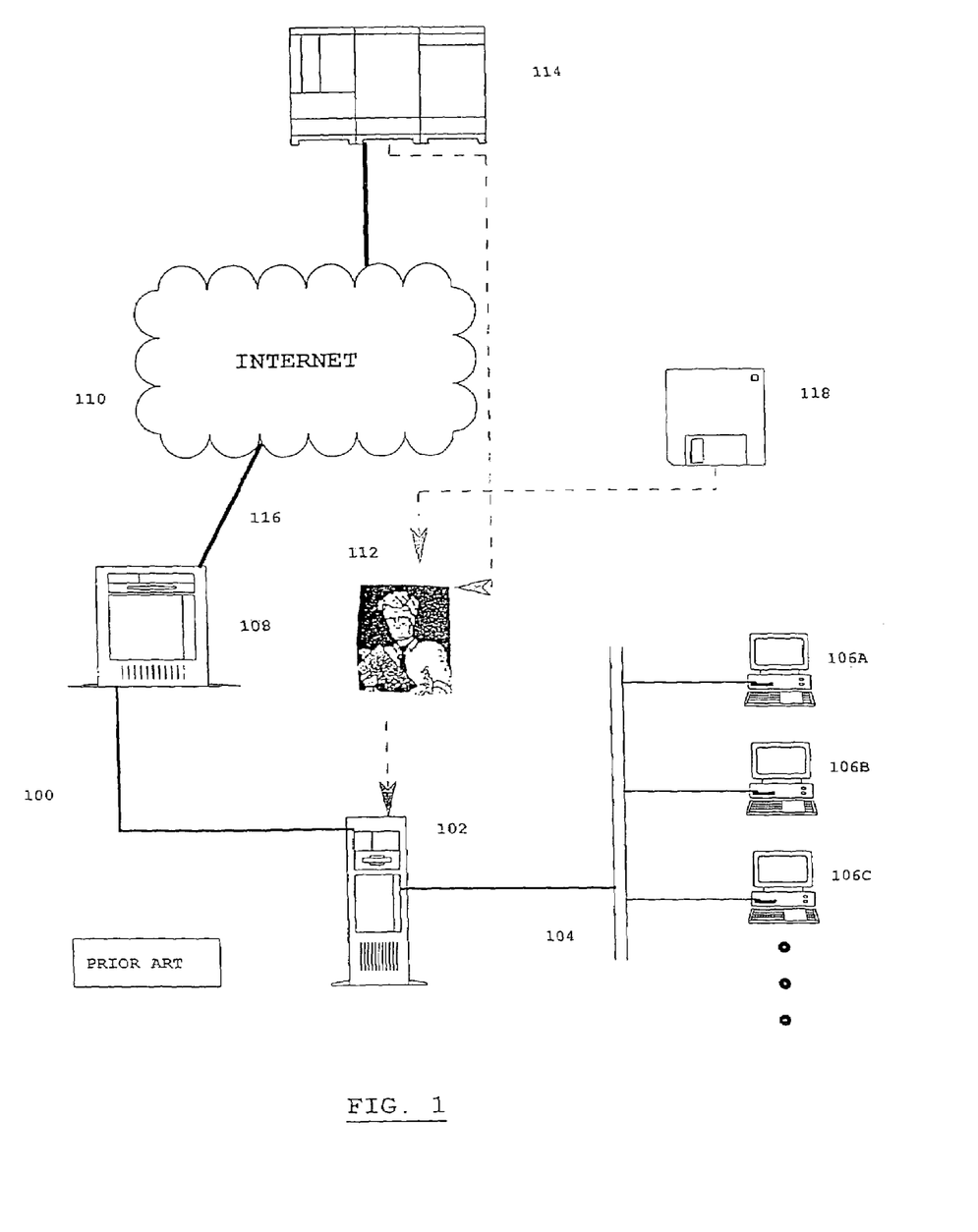
FIG. 1 shows a prior art method of updating anti-intrusion software.

FIG. 1 shows the prior art method of updating attack pattern information, which includes attack signature files, on a network running anti-intrusion software. FIG. 1 shows a typical corporate local area network 100 comprising a network server 102, a communications network 104 such as an Ethernet network, a plurality of user nodes 106A-C and an Internet gateway server 108 connected to the Internet 110 through Internet connection 116. As known in the art, Internet connection 116 can be through an ISP (Internet Service Provider) in the form of a SLIP (Serial Line Interface Protocol) or PPP (Point to Point Protocol) connection, or through a dedicated connection to the Internet 110.

Running on network server 102 is anti-intrusion software (not shown) which monitors the traffic on the communications network 104 for attacks and other malicious activities. This combination of network server and anti-intrusion software is herein referred to as an "anti-intrusion monitor server." Typically, a dedicated system administrator 112 is responsible for ensuring that the anti-intrusion software stays updated. To do so, he can obtain updated or modified attack pattern information from the anti-intrusion software manufacturer's FTP or World Wide Web site 114. However, this request must be made manually and with knowledge of the current attack signature files loaded on anti-intrusion monitor server 102. Alternatively, the anti-intrusion software manufacturer may send out updated or modified attack pattern information via CD-ROM or floppy disk 118. The system administrator 112 then manually installs the updated information on anti-intrusion monitor server 102. In either case, the attack pattern information is updated only as often as the system administrator has time to collect and install the updates, a practice which may be costly in light of the ongoing, non-stop efforts of malicious crackers.

An additional level of complexity is added if there are multiple anti-intrusion monitor servers which must be updated individually (i.e. there is no remote configuration functionality as with CyberCop Network). In that case, in attempting to obtain the appropriate updated attack pattern information, the system administrator would be required to: 1) maintain an awareness of all attack pattern information on each server; 2) maintain an awareness of the hardware platform (e.g. IBM, Macintosh, Sun, Silicon Graphics) and software platform (e.g. Windows NT, Windows 95, Windows 3.1, Macintosh OS, UNIX) of each server to ensure acquisition of the appropriate information; and 3) retrieve and install the latest versions of updates for each server as soon as those updates become available. The odds of accurate and efficient anti-intrusion updating are reduced even further.

Accordingly, it would be desirable to provide a computer program product and method for providing the most up-to-date intrusion attack monitoring and detection via updated attack signature files for protecting against newer attacks.

It would be further desirable to provide a computer program product and method for the anti-intrusion software updating to be simple and automatic, so that less system administrator intervention is necessary.

It would be even further desirable to provide a computer program product and method of anti-intrusion software update distribution which allows a higher frequency of update releases from anti-intrusion software manufacturers for the most up-to-date, or even up-to-the-hour, anti-intrusion attack protection available.

It would be even further desirable to provide a computer program product and method where attack signature files are automatically distributed to a gateway monitor server, which can then distribute the updated attack signature files to other networked computers either automatically or in accordance with user-set monitoring profiles.

SUMMARY OF THE INVENTION

A computer program product in accordance with a preferred embodiment modifies anti-intrusion software on a computer network which has an anti-intrusion monitor server. The anti-intrusion monitor server recognizes attacks on the computer network in accordance with attack pattern information contained in the anti-intrusion software. The computer program product comprises computer code that installs modified attack pattern information onto a central anti-intrusion server, and computer code that transfers the modified attack pattern information from the central anti-intrusion server to the anti-intrusion monitor server using push technology. The result is that newly discovered attack patterns are capable of being rapidly communicated from the central anti-intrusion server to the computer network.

In another preferred embodiment, the computer program product provides modified attack pattern information to an anti-intrusion monitor server on a computer network having anti-intrusion software. The computer program product comprises computer code that installs the modified attack pattern information onto a central anti-intrusion server; and computer code that transfers the modified attack pattern information from the central anti-intrusion server to a push administration computer connected to the Internet. The push administration computer is capable of transmitting attack pattern information, as well as other types of information, to the anti-intrusion monitor server using push technology. The push administration computer includes an attack pattern update database containing information related to the latest modified attack pattern information transferred to the anti-intrusion monitor server. Only modified attack pattern information not reflected in said information as having been transferred is transferred from said push administration computer to the anti-intrusion monitor server over the Internet using push technology.

In yet another preferred embodiment, a computer program product provides modified attack pattern information to at least one network having multiple anti-intrusion monitor servers. The anti-intrusion monitor servers include a management anti-intrusion monitor server capable of remote management of other anti-intrusion monitor servers in accordance with predetermined management parameters. The computer program product comprises computer code that installs the modified attack pattern information onto a central anti-intrusion server; computer code that transfers the modified attack pattern information from said central anti-intrusion server to the management anti-intrusion monitor server using push technology; and computer code that remotely installs the modified attack pattern information from the management anti-intrusion monitor server to other anti-intrusion monitor servers in accordance with the predetermined management parameters.

DETAILED DESCRIPTION OF THE DRAWINGS

Figure 2:
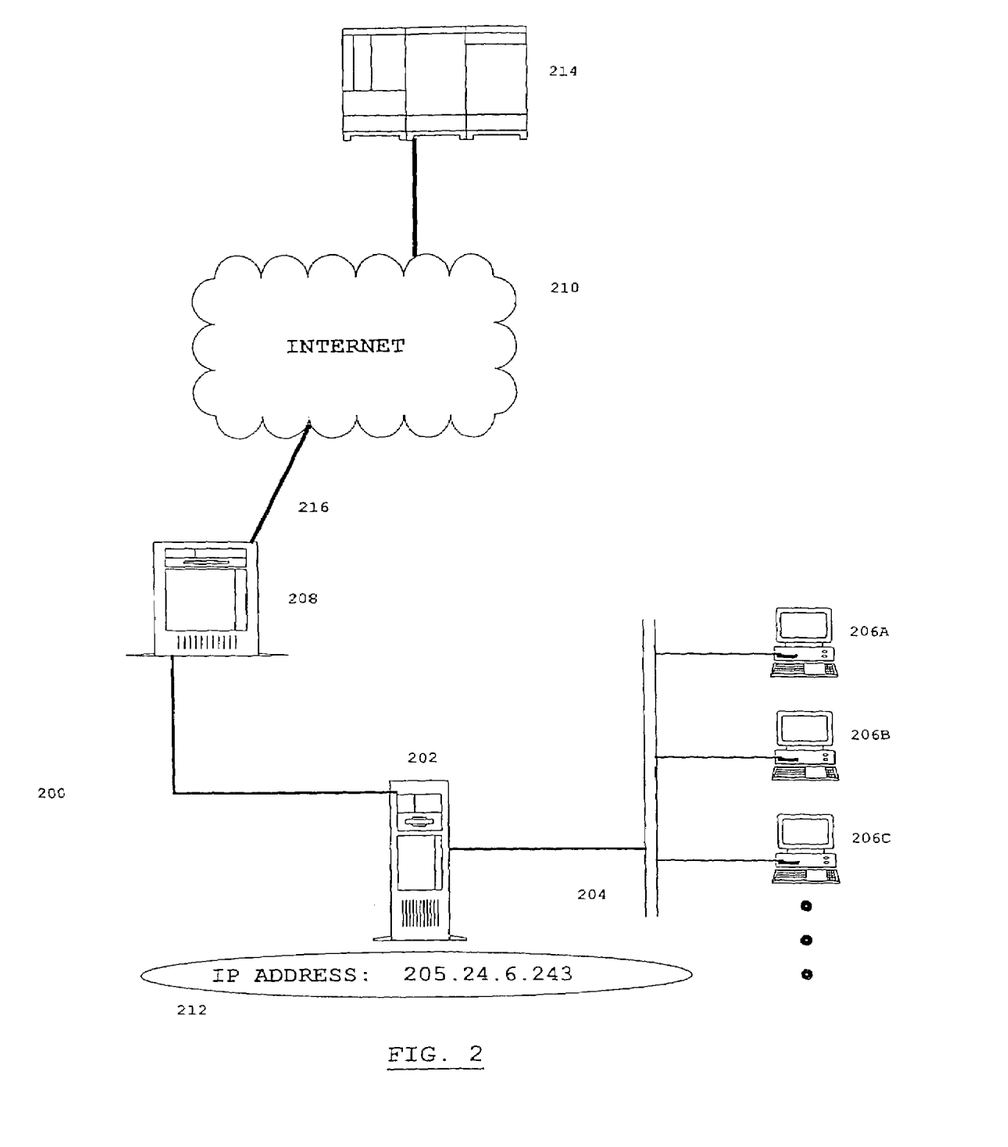
FIG. 2 shows a computer network according to a preferred embodiment.

FIG. 2 shows a computer network 200 according to a preferred embodiment. As with FIG. 1, computer network 200 comprises an anti-intrusion monitor server 202, a communications network 204, a plurality of user nodes 206A-C, an Internet gateway server 208 and an Internet connection 216. For illustrative purposes, and not by way of limitation, anti-intrusion monitor server 202 is a Pentium-based server running Windows NT.

Also for illustrative purposes, in the embodiment shown in FIG. 2, Internet connection 216 is a dedicated connection in which Internet gateway server 208 is connected to the Internet 210 full-time through a high-speed link such as a T1 line. The scope of the preferred embodiment is not limited to dedicated Internet connections, however; any method of coupling Internet gateway server 208 to the Internet is envisioned, such as a dial-up SLIP/PPP connection through an ISP. The establishment of Internet connection 216 allows nodes on the computer network 200 to send and receive information to other nodes on the Internet 210 using the TCP/IP protocol. At the time of connection to the Internet, anti-intrusion monitor server 202 is assigned IP address 212, effectively becoming a node.

Also shown in FIG. 2 is central anti-intrusion server 214 having a packet-switched connection to Internet 210. Central anti-intrusion server generally 214 comprises a computer that is capable of sending and receiving information over the Internet 210; capable of storing, retrieving and maintaining attack pattern information; and capable of running other applications. In one form, central anti-intrusion server 214 comprises a World Wide Web site having a variety of useful anti-intrusion information available to subscribers. Central anti-intrusion server 214 is usually associated with an anti-intrusion software manufacturer, storing and maintaining versions of anti-intrusion software and attack pattern information created by that manufacturer. However, the scope of the preferred embodiment is not so limited, and central anti-intrusion 214 may also comprise, for example, a "clearinghouse" of information on a variety of topics, and may be capable of providing non-anti-intrusion information, such as a news-based subscriber service.

Using means not shown in FIG. 2, central anti-intrusion server 202 is kept up-to-date with the lasted updated or modified attack pattern information. New attack pattern information in the form of attack signature files may be uploaded to the central anti-intrusion server 202 as rapidly as attack characteristics can be determined and implemented in an attack signature file. Importantly, this means that within days or even hours of the public announcement of a new type of attack, updated attack pattern information which will detect such an attack may be uploaded and available on central anti-intrusion server 214.

When Internet connection 216 is established between Internet gateway server 208 and Internet 210, central anti-intrusion server 214 sends updated attack pattern information to anti-intrusion monitor server 202 if anti-intrusion monitor server 202 has not previously received the information. The transmission occurs using push technology in a transaction substantially transparent to users 206A-C and the system administrator (who, reflecting the fact that his participation is unnecessary, is not pictured). That process will be described next.

Figure 3:
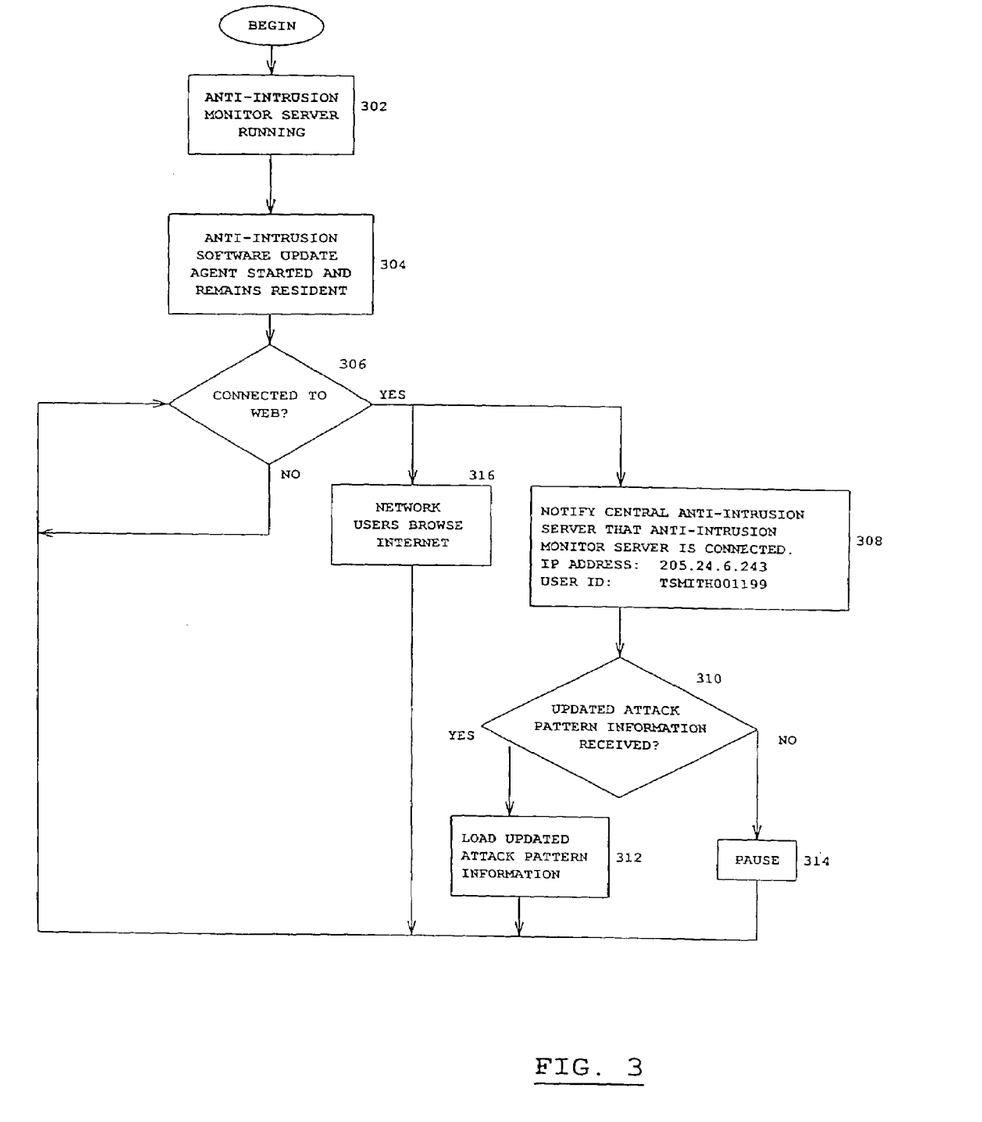
FIG. 3 shows steps taken by an anti-intrusion monitor server according to a preferred embodiment.

Turning next to FIG. 3, the steps taken by anti-intrusion monitor server 202 are shown. At step 302, the anti-intrusion monitor server 202 is turned on or otherwise activated. At this time, as known in the art, anti-intrusion software on the anti-intrusion monitor server 202 is activated, usually automatically. As monitoring by the anti-intrusion monitor server 202 must generally occur around-the-clock, step 302 will only happen at the very initial stage of instituting anti-intrusion software protection. The anti-intrusion software monitors all traffic on a network segment, comparing packet traffic with packet information known to indicate an attack or malicious activity within certain protocols. For example, TCP/IP packets will be scanned for known TCP/IP attacks. By monitoring all traffic on a network, the anti-intrusion software can recognize attacks on the network, on the anti-intrusion monitor server, or on other computers on the network.

According to a preferred embodiment, the anti-intrusion software includes an update agent which is started and remains resident in anti-intrusion monitor server 202 at step 304. As shown at step 306, the anti-intrusion software update agent generally remains dormant on anti-intrusion monitor server 202 until Internet connection 216 is instituted at step 306. Step 306 is a detection step, wherein the anti-intrusion software update agent queries the operating system of anti-intrusion monitor server 202 for an indication that Internet connection 216 has been established and IP address 212 has been assigned.

At step 308, the anti-intrusion software update agent notifies central anti-intrusion server 214 that anti-intrusion monitor server 202 is connected to the Internet 210. Among the information transmitted from the anti-intrusion monitor server 202 to the central anti-intrusion server 214 are two items of data used for achieving automated download and updating of attack pattern information on anti-intrusion monitor server 202. This information includes: 1) the IP address 212 of anti-intrusion monitor server 202; and 2) a unique user ID attributable to anti-intrusion monitor server 202 (e.g. "TSMITH001199").

At step 310, updated attack pattern information may be received at anti-intrusion monitor server 202 if any such files are sent by the central anti-intrusion server 214. If updated attack pattern information is received by anti-intrusion monitor server 202, the attack pattern information is loaded at step 312. If such information is not received, at step 314 the anti-intrusion software update agent pauses. Following step 312 or 314, the decision step 306 is again performed.

The loading step 312 may be an automatic loading step, in which the downloaded updated attack pattern information is a self-extracting archive file, executing automatically and inserting the attack signatures files contained in the updated attack pattern information into the appropriate directory of anti-intrusion monitor server 202. Upon completion of the installation, the system administrator is notified of the receipt and installation of updated attack pattern information. This requires a minimum of intervention, if any, by a system administrator. Optionally, according to another preferred embodiment, the downloaded information may cause a "flash" notification to be seen by the system administrator, offering two choices: 1) install the updated attack pattern information immediately, or 2) delay the installation process until a later time.

FIG. 3 also shows step 316 in which users 206A-C of computer network 200 can browse the Internet normally while Internet connection 216 is established. Any updated attack pattern information transmitted and installed to the anti-intrusion monitor server 202 occurs in parallel with step 316, transparent to users 206A-C.

Figure 4:
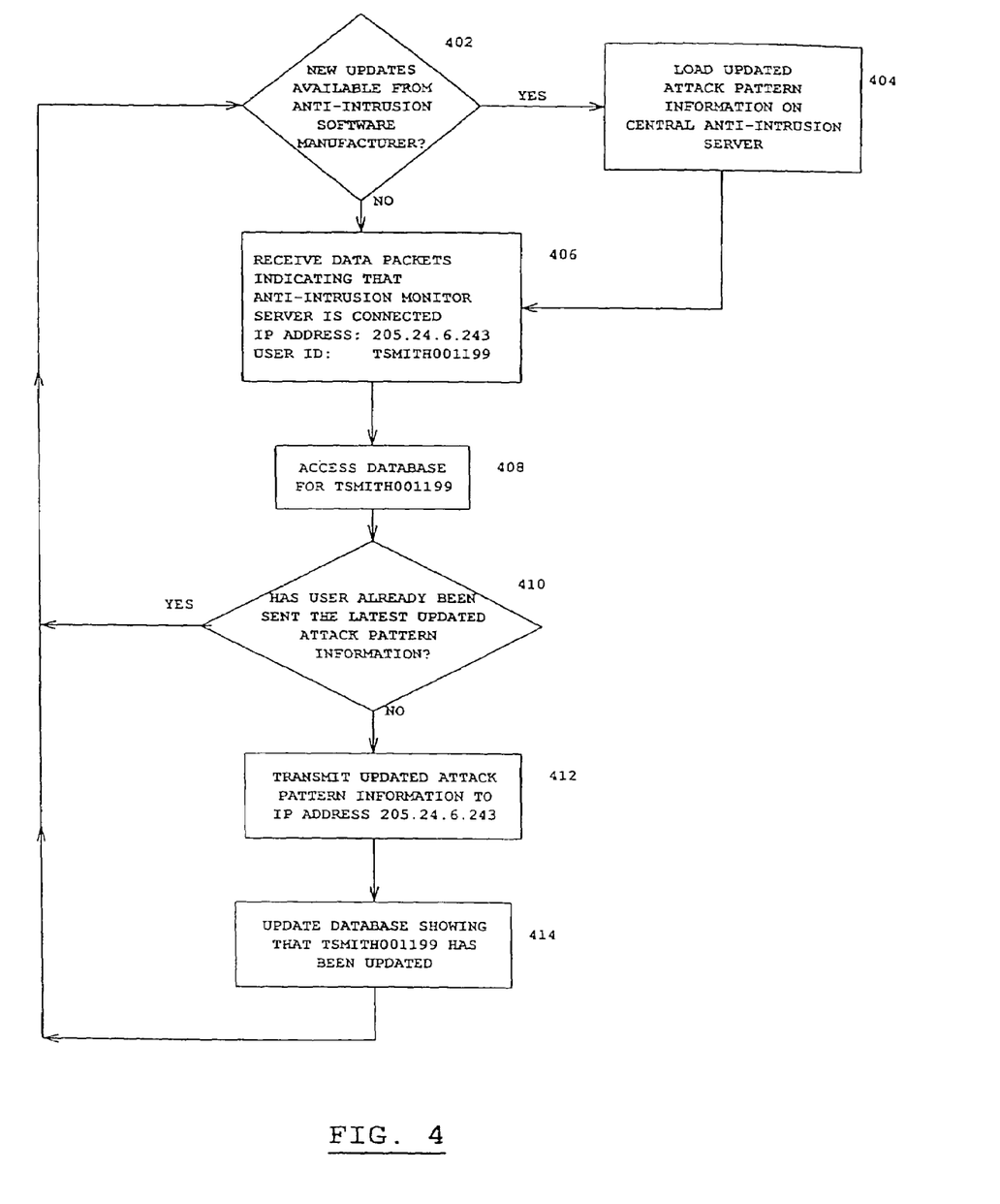
FIG. 4 shows steps taken by a central anti-intrusion server according to a preferred embodiment.

FIG. 4 shows the steps taken by central anti-intrusion server 214 in accordance with a preferred embodiment. At step 402, central anti-intrusion server 214 determines whether updated attack pattern information is available from the anti-intrusion software manufacturer. If such an update is available, the updated attack pattern information is loaded onto the central anti-intrusion server 214 at step 404. By way of example, but not limitation, the updated attack pattern information may contain one or more attack signature files in a self-extracting archive file format. Each attack signature file may contain packet information which corresponds to attack characteristics, as well as protocol information identifying the protocol in which such an attack will occurs. Furthermore, the attack-signature file(s) may be contained in a dynamic linked library, including a pointer to the library so that the attack signature file(s) can be incorporated into the logic of the anti-intrusion scanning engine of the anti-intrusion software on anti-intrusion monitor server 202.

Next, at step 406, the central anti-intrusion server 214 receives a notification that anti-intrusion monitor server 202 is connected to the Internet via Internet connection 216. Central anti-intrusion server 214 is provided with the anti-intrusion monitor server 202's user ID, e.g. TSMITH001199, and the anti-intrusion monitor server 202's associated IP address 212.

In the preferred embodiment shown in FIG. 4, the central anti-intrusion server 214 next accesses a subscriber database containing a list of all known or registered subscribers, sorted by their user ID. At step 410, using a database lookup procedure, central anti-intrusion server 214 determines whether anti-intrusion monitor server 202 has been sent the most recently updated attack pattern information. If anti-intrusion monitor server 202 has already received that version of the updated attack pattern information, no action is taken for anti-intrusion monitor server 202, and steps 402-406 are repeated.

However, if it is determined that anti-intrusion monitor server 202 has not received the most recent updated attack pattern information, at step 412 the information is transmitted to the anti-intrusion monitor server 202 at IP address 212. At step 414, the subscriber database is updated to reflect the fact that user TSMITH001199 (i.e. anti-intrusion monitor server 202) has received the updated attack pattern information. Importantly, it is to be appreciated that steps 406-414 are carried out for each of the plurality of subscribers such as TSMITH001199. Generally speaking, there may be many such subscribers. Central anti-intrusion server 214 must therefore be equipped with sufficient hardware and database capability to handle the resulting traffic.

In an alternative embodiment not shown in FIG. 4, another method to determine whether to send updated attack pattern information is utilized. In this embodiment, once the central anti-intrusion server 214 receives the user ID and associated IP address 212, it sends a query signal to the anti-intrusion monitor server 202 at IP address 212. Anti-intrusion monitor server 202 responds by transmitting the identity of the last updated attack pattern information received by anti-intrusion monitor server 202. Central anti-intrusion server 214 will then transmit any more recent updates that anti-intrusion monitor server 202 has not indicated it has received.

While two methods for determining whether to send updated attack pattern information have been described herein, the scope of the preferred embodiment is not meant to be limited to only these methods; any method of determining whether to send updated attack pattern information to the anti-intrusion monitor server 202 is envisioned. For example, the preferred embodiment is meant to include transmitting updated attack pattern information to all users of anti-intrusion software at the time when such updates are uploaded to central anti-intrusion server 214, without reference to a subscriber database.

Figure 5:
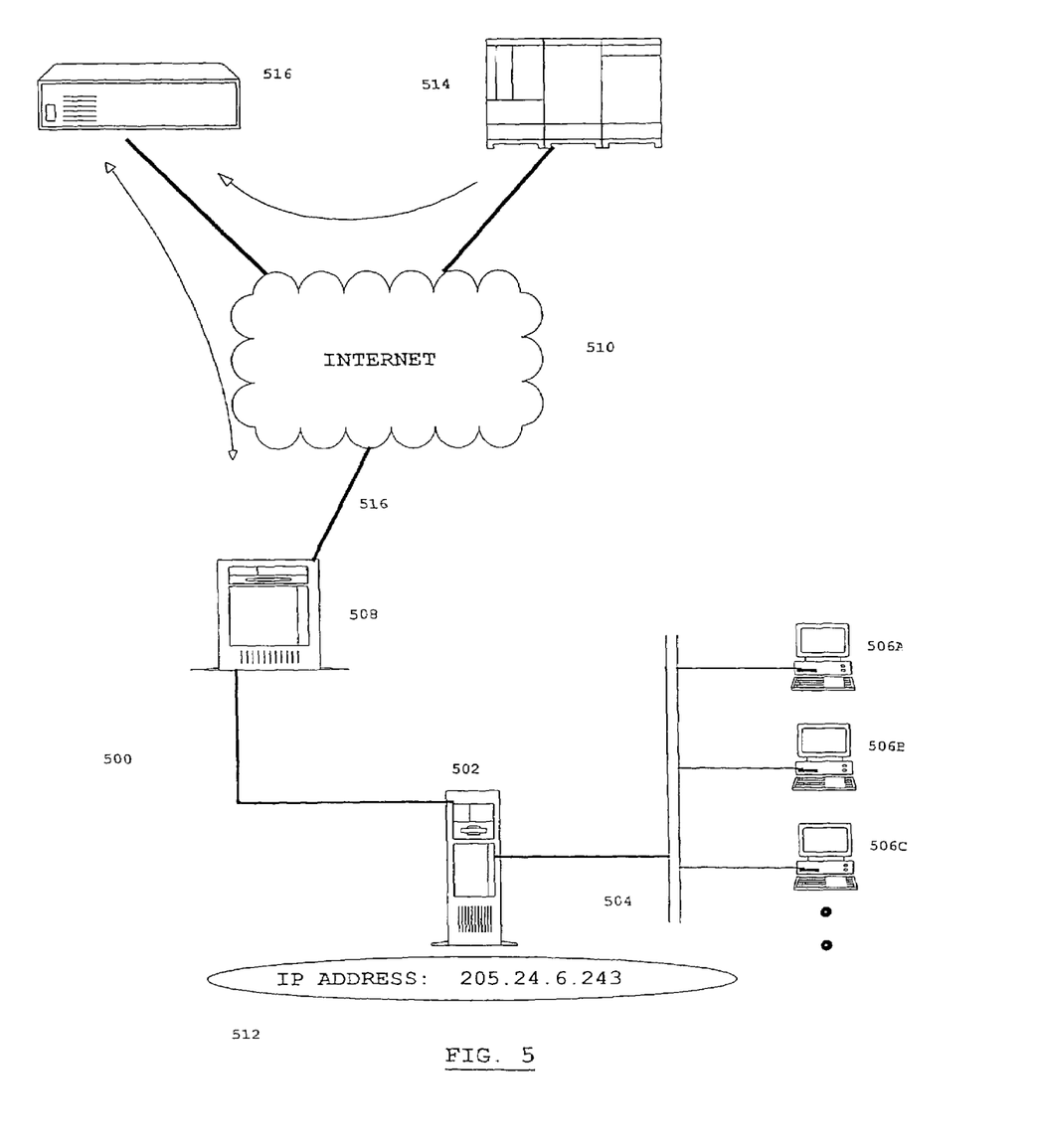
FIG. 5 shows a computer network according to another preferred embodiment.

FIG. 5 shows a diagram of computer network 100 according to another preferred embodiment. It has been found that a mechanism for "pushing" the needed updates to client computers can be efficiently configured using a dedicated push administrator system 516 separate from central anti-intrusion server 514. In practice, the push administrator is separated from the administrators of the central anti-intrusion server company both physically and organizationally, allowing the anti-intrusion software manufacturer to focus on the anti-intrusion aspects of the updated attack pattern information, and allowing the push administrator to focus on the push delivery mechanism.

As with FIGS. 1 and 2, FIG. 5 shows a computer network 500 comprising an anti-intrusion monitor server 502, a communications network 504, a plurality of user nodes 506A-C and an Internet gateway server 508 connected to the Internet 510 through Internet connection 516. Also connected to Internet 510 is central anti-intrusion server 514 and push administration computer 516. In the preferred embodiment of FIG. 5, the central anti-intrusion server 514 serves a more limited function than the central anti-intrusion server 214 of FIG. 2. In particular, the central anti-intrusion server has limited interaction with anti-intrusion monitor server 502, and instead transfers updated attack pattern information to the push administration computer 516.

It is the push administration computer 516 that interacts with the anti-intrusion monitor server 502 in a manner similar to steps 406-414 of FIG. 4. Additionally, the push administration computer 516 may interact with anti-intrusion monitor server 502 with regard to other applications such as technical news updates or application updates. Advantageously, according to a preferred embodiment, the anti-intrusion developers and engineers are permitted to focus on the anti-intrusion aspects of the updates, and the push administration engineers may focus on optimally delivering the information to anti-intrusion monitor server 502 using push technology. Together, these elements provide for faster and more efficient distribution of the latest updated attack pattern information than prior art distribution systems.

In general, the push administration computer 516 pushes channelized information of all types to anti-intrusion monitor server 502 according to a subscription plan for the users of anti-intrusion monitor server 502. Updated attack pattern information is delivered on one of the subscriber channels.

Figure 6:
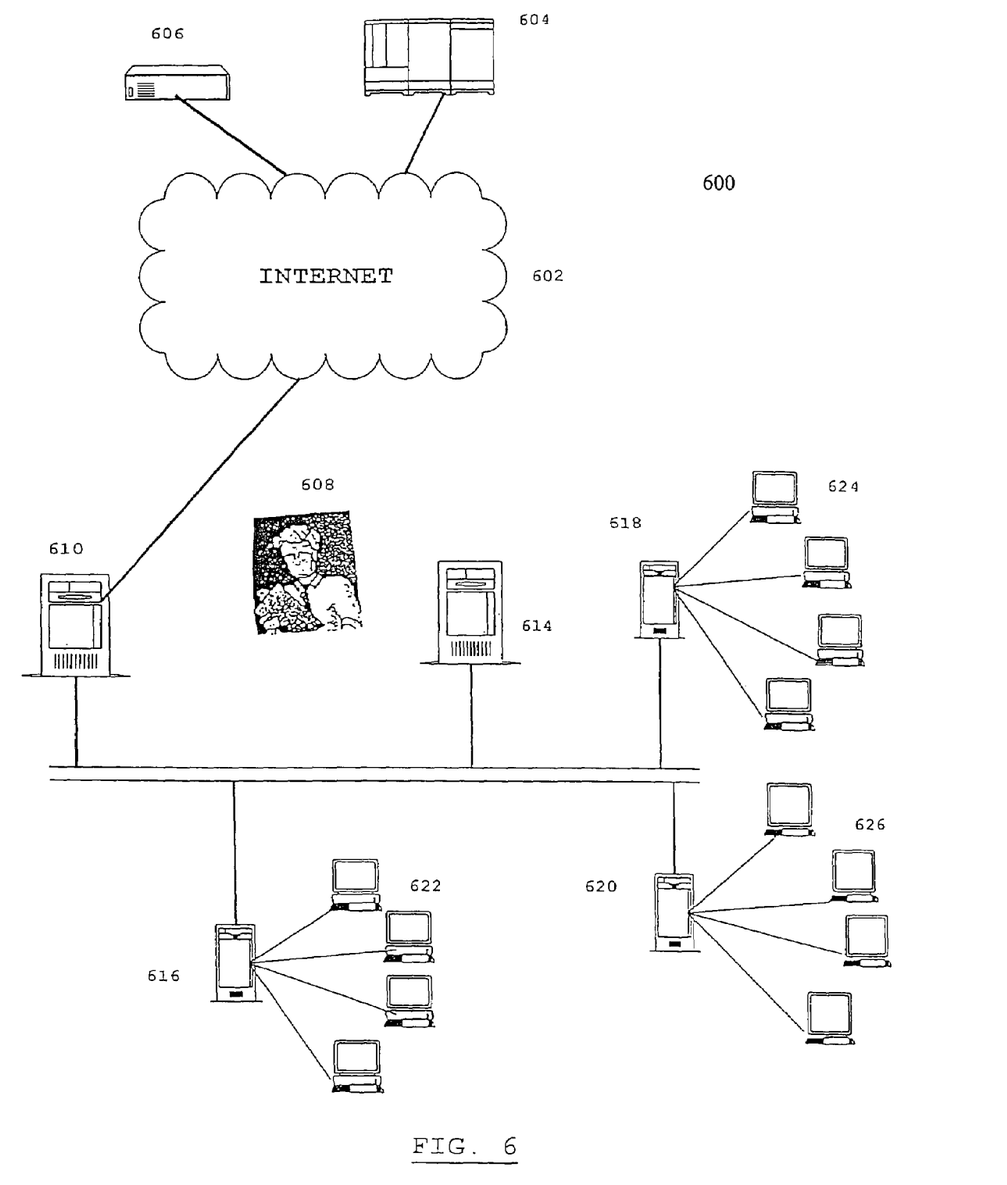
FIG. 6 shows a corporate computer network according to another preferred embodiment.

FIG. 6 shows a diagram of a corporate computer network 600 according to another preferred embodiment. Corporate computer network 600 is generally a large corporate network comprising many servers and client computers. In particular, corporate computer network 600 comprises: Internet gateway server 610; common anti-intrusion monitor server 614; a first local anti-intrusion monitor server 616; a second local anti-intrusion monitor server 618; a third local anti-intrusion monitor server 620; a first set of client computers 622; a second set of client computers 622; and a third set of client computers 626. Anti-intrusion software (not shown) is installed on the common anti-intrusion monitor server 614 and on each local anti-intrusion monitor server 616-620. Each anti-intrusion monitor server can monitor all traffic on the network segment to which it is connected.

Each group of a local anti-intrusion monitor server and client computers may correspond to a department of a company, for example, a marketing or engineering department. Internet gateway server 610 links the entire corporate network 600 to the Internet 602. Also coupled to the Internet are central anti-intrusion server 604 and push administration computer 606.

The common anti-intrusion monitor server 614 is a service computer, dedicated at least in part to assisting in servicing the various hardware and software applications being used in corporate computer network 600. Common anti-intrusion monitor server 614 would typically be run by a system administrator, help desk administrators, or designated power users, shown at 608. System administrator 608 generally configures and maintains corporate computer network 600 and its hardware and software applications.

According to a preferred embodiment, common anti-intrusion monitor server 614 is loaded with an anti-intrusion software update agent capable of: 1) automatically receiving updated attack pattern information for a variety of servers on corporate network 600 according to a push technology method; and 2) automatically distributing the updated attack pattern information according to predetermined management parameters. In this sense, common anti-intrusion monitor server 614 is a management anti-intrusion monitor server, capable of remotely configuring local anti-intrusion monitor servers 616-620. This receipt and distribution of updated attack pattern information occurs without the need for affirmative action by the system administrator 608. This can advantageously lead to increased efficiency, lower costs, and reduced human errors, while at the same time increasing anti-intrusion monitor server integrity and network efficiency.

For added security, in a preferred embodiment the communications between the common anti-intrusion monitor 614 and local anti-intrusion monitor servers 616-620 occur using an encrypted communication link.

The predetermined management parameters can be a default set supplied with the anti-intrusion software which may, for example, dictate that all received updated attack pattern information will be distributed and installed on all of the local anti-intrusion monitor servers 616-620. In another embodiment, the predetermined management parameters may be specified by the system administrator using dropand-drop functions to specify which types of attack pattern information will be distributed to which local servers. For example, if local anti-intrusion monitor server 616 is a FTP (File Transfer Protocol) server, then the predetermined management parameters on the common anti-intrusion monitor server 614 may specify that any updated FTP attack pattern information received at common anti-intrusion monitor server 614 will be distributed to and installed on local server 616.

The predetermined management parameters allow configuration of not only the remote local anti-intrusion servers 616-620, but also the common anti-intrusion monitor server 614 itself, all occurring at the common anti-intrusion monitor server 614. In one embodiment, the configurations of the common and local anti-intrusion monitor servers may be set to complement each other. For example, common anti-intrusion monitor server 614 may be configured to watch for the types of attacks most likely to occur on computer network 600 by outside crackers trying to get past Internet gateway server 610, while local anti-intrusion monitor servers 616-620 may be configured to watch for internal attacks originating from within their particular client grouping. In this sense, network 600 is thoroughly protected from both inside and outside intrusion attacks.

Figure 7:
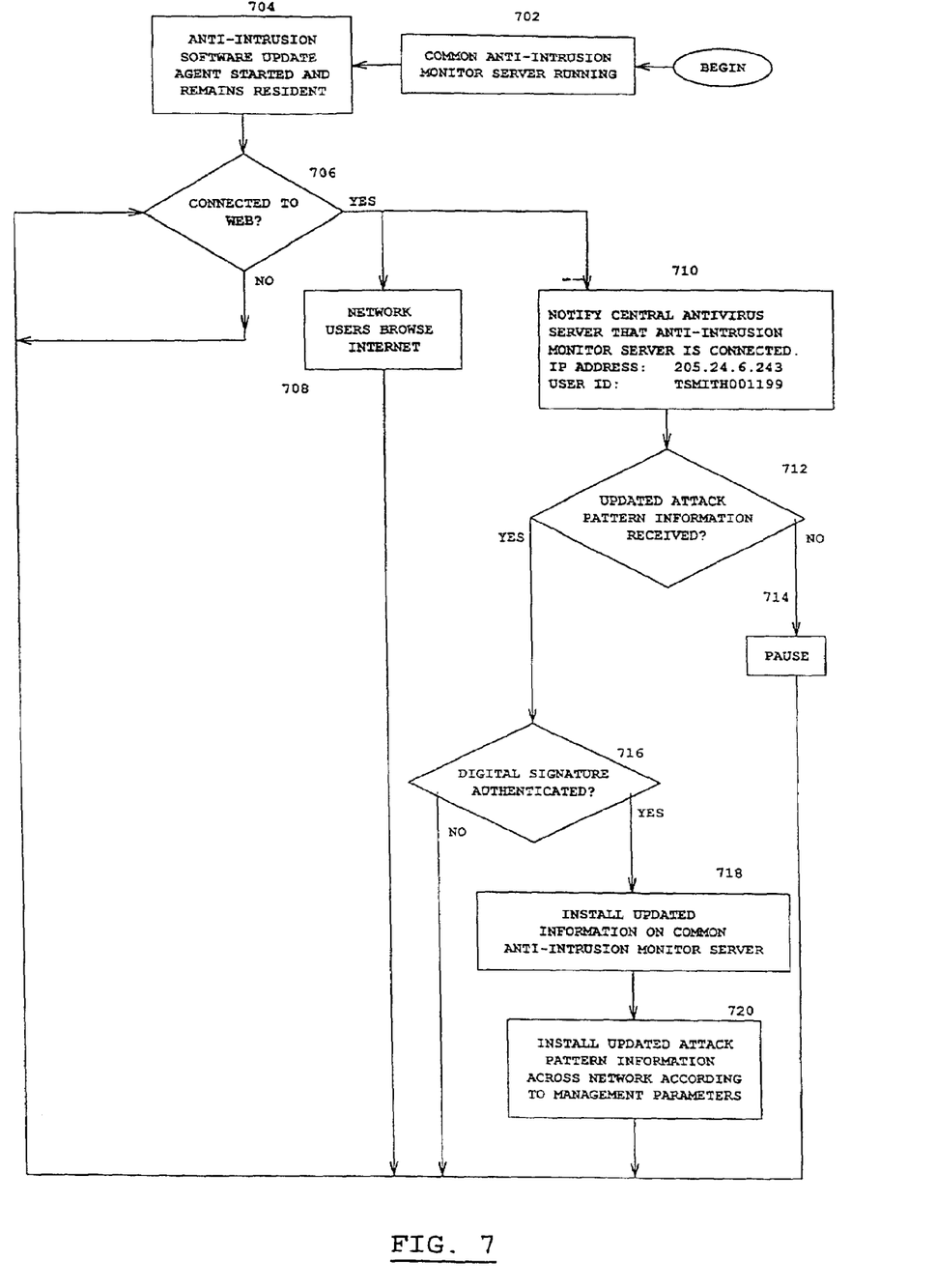
FIG. 7 shows steps taken by a common anti-intrusion monitor server.

FIG. 7 shows the steps taken by common anti-intrusion monitor server 614 according to a preferred embodiment. At step 702, common anti-intrusion monitor server 614 would be initiated or otherwise activated, as would be the anti-intrusion software contained on common anti-intrusion monitor server 614. As monitoring by the common anti-intrusion monitor server 614 must occur around-the-clock, step 710 will only occur at the very initial stage of instituting anti-intrusion software protection. At step 704, an anti-intrusion software update agent is started and remains resident on the common anti-intrusion monitor server 614.

As shown at step 706, the anti-intrusion software update agent generally remains dormant on anti-intrusion monitor server 202 until a connection to the Internet is instituted, whether by a SLIP/PPP connection, or a dedicated connection. Step 706 is a detection step, wherein the anti-intrusion software update agent queries the operating system of common anti-intrusion monitor server 614 for an indication that an Internet connection has been established, and that an IP address has been assigned for the common anti-intrusion monitor server 614.

Once an Internet connection is detected, at step 710, either in a single packet or multiple packets as required, the anti-intrusion software update agent: 1) advises the push administration computer 606 that common anti-intrusion monitor server 614 is attached to the Internet; 2) provides the push administration computer 606 with the IP address of common anti-intrusion server 614; and 3) provides the push administration computer 606 with the user ID (e.g. "TSMITH001199") associated with the common anti-intrusion server 614. As discussed in the context of FIG. 4, the push administration computer 606 may then either look up the user ID in a subscriber database, or query common anti-intrusion monitor server 614 itself, to determine if common anti-intrusion monitor server 614 has received the most recent updated attack pattern information. In either case, if the common anti-intrusion monitor server 614 has not received the most recent updated attack pattern information, this updated information will be sent to common anti-intrusion monitor server 614 using push technology.

In an alternative embodiment, no push administration computer is used; the central anti-intrusion server 510 would control both the "push" and the content of the updated attack pattern information, similar in nature to the steps performed by the central anti-intrusion server of FIG. 4.

At step 712, common anti-intrusion monitor server 614 receives updated attack pattern information if appropriate. If the common anti-intrusion monitor server 614 does not receive any updates, the anti-intrusion software update agent pauses at step 714 before returning to the decision step of 706. If the common anti-intrusion monitor server 614 does receive updated attack pattern information, the anti-intrusion software update agent then verifies at step 716 whether or not the updated attack pattern information includes a digital signature, which the anti-intrusion software update agent can authenticate as originating from the anti-intrusion software manufacturer. If the digital signature cannot be verified, the updated attack pattern information is not installed and the decision step 706 is again performed.

If the digital signature is authenticated as originating from the anti-intrusion software manufacturer, the updated attack pattern information is installed on the common anti-intrusion monitor server 614 at step 718. In the preferred embodiment, this occurs automatically and in accordance with the predetermined management parameters, as discussed in the context of FIG. 6. The downloaded updated attack pattern information is in self-extracting archive file format, and automatically executes and inserts the appropriate attack signatures files contained in the updated attack pattern information into the appropriate directory of common anti-intrusion monitor server 614.

Next, at step 720, the updated attack pattern information is installed across corporate computer network 600 to the local anti-intrusion monitor servers 616-620 in accordance with the predetermined management parameters. Upon completion of the installations, the system administrator is notified of the receipt and installation of updated attack pattern information. This requires a minimum of intervention, if any, by a system administrator. Optionally, according to another preferred embodiment, the downloaded information may cause a "flash" notification to be seen by the system administrator, offering two choices: 1) install the updated attack pattern information immediately, or 2) delay the installation process until a later time.

At the completion of the installation, the common anti-intrusion monitor server 614 returns to decision step 706. Importantly, at step 708 the users of the network (clients 622-626) can browse the Internet normally, as steps 710-720 occur in parallel with step 708, transparent to the network users.

While preferred embodiments have been described herein, these descriptions are merely illustrative and are not intended to limit the scope of the present invention. Thus, although the embodiments described above were in the context of a central anti-intrusion server using "push" technology, wherein affirmative queries are sent from resident anti-intrusion software update agents on anti-intrusion monitor servers before updated attack pattern information is sent, those skilled in the art will recognize that the disclosed methods and structures are readily adaptable for broader applications. As an example, within the scope of the preferred embodiments would be an anti-intrusion software update agent which would cause the anti-intrusion monitor server to connect to the Internet at a period during which there is little Internet traffic, for example the early a.m. hours, to download updated attack pattern information.

Also within the scope of the preferred embodiments are systems where anti-intrusion software manufacturers and update subscribers are linked by means of a private network or an alternative global network other than the Internet.

Thus, while preferred embodiments have been described, these descriptions are merely illustrative, and the scope of the present invention is limited only by the appended claims.

What is claimed is:

1. A computer program product embodied on a computer readable medium that modifies anti-intrusion software on a computer network having an anti-intrusion monitor server, the anti-intrusion monitor server for recognizing attacks on the computer network in accordance with attack pattern information contained in the anti-intrusion software, comprising:

computer code that installs modified attack pattern information onto a central anti-intrusion server; and computer code that transfers said modified attack pattern information from said central anti-intrusion server to the anti-intrusion monitor server via a push administration device using push technology;

whereby newly discovered attack patterns are capable of being rapidly communicated from said central anti-intrusion server to the computer network.

2. The computer program product of claim 1, further comprising computer code that installs push agent software onto the anti-intrusion monitor server, said push agent software being capable of instructing the anti-intrusion monitor server to communicate over the Internet with said central anti-intrusion server when the anti-intrusion monitor server is connected to the Internet, said push agent software being capable of instructing the anti-intrusion monitor server to receive said modified attack pattern information from said central anti-intrusion server.

3. The computer program product of claim 2, further comprising computer code that establishes a connection between the anti-intrusion monitor server and the Internet, wherein said push agent software receives said modified attack pattern information in a background procedure which is substantially transparent to a system administrator of the computer network.

4. The computer program product of claim 3, wherein said modified attack pattern information is a self-extracting archive file, and wherein said push agent software is capable of executing said modified attack pattern information automatically upon receipt, whereby no affirmative user commands are required during a time period between said establishment of said Internet connection and a completed installation of said modified attack pattern information.

5. The computer program product of claim 4, further comprising computer code that notifies said system administrator that said installation of said modified attack pattern information is complete.

6. The computer program product of claim 1, wherein said modified attack pattern information comprises packet information and protocol information.

7. The computer program product of claim 6, wherein said packet information and said protocol information are contained in a dynamic linked library file.

8. The computer program product of claim 7, wherein said modified attack pattern information further comprises a pointer to said dynamic linked library file for directing the anti-intrusion monitor server to include said dynamic linked library file into the anti-intrusion software executed by the anti-intrusion monitor server.

9. The computer program product of claim 1, wherein the anti-intrusion server monitor is configured to monitor all traffic on the local area network.

10. The computer program product of claim 9, wherein the anti-intrusion software is capable of recognizing attacks on the local area network, on the anti-intrusion monitor server, and on other computers on the local area network.

11. A computer program product embodied on a tangible computer readable medium for distributing intrusion detection signatures over a network, comprising;

computer code that identifies intrusion detection signatures utilizing a central anti-intrusion server; and computer code that automatically transfers the intrusion detection signatures from the central anti-intrusion server throughout a network;

whereby newly discovered intrusion detection signatures are capable of being rapidly communicated from the central anti-intrusion server via a push administration device throughout the network.

12. The computer program product of claim 11, wherein the intrusion detection signatures are transferred from the central anti-intrusion server throughout the network automatically utilizing push technology.

13. A computer program product embodied on a computer readable medium that provides modified attack pattern information to one or more local area networks having corresponding local anti-intrusion monitor servers associated therewith, the local area networks being connected to a common network, the common network having a common anti-intrusion server, the local anti-intrusion monitor servers configured to recognize intrusion attacks on the local area networks, the common anti-intrusion monitor server configured to recognize intrusion attacks on the common network, comprising:

computer code that installs the modified attack pattern information onto a central anti-intrusion server;

computer code that transfers the modified attack pattern information from the central anti-intrusion server via the push administration device to the common anti-intrusion monitor server using push technology; and computer code that executes an installation script at the common anti-intrusion monitor server for installing modified attack pattern information on the local anti-intrusion monitor servers across the common network.

14. The computer program product of claim 13, wherein execution of said installation script occurs automatically with no affirmative user commands required.

15. The computer program product of claim 13, wherein said common anti-intrusion monitor server has predetermined management parameters, wherein execution of said installation script occurs in accordance with said predetermined management parameters.

16. In a computer network comprising a packet-switched network, a first computer coupled to the packet switched network, and a second computer on a local area-network intermittently coupled to the packet-switched network, a method for providing modified attack pattern information from the first computer to the second computer in a manner which is transparent to all users of the local area network, comprising:

at the second computer, executing a first program for detecting when the second computer is connected to the packet-switched network;

when the second computer is connected to the packet-switched network, transmitting a signal from the second computer to the first computer indicating that the second computer is connected to the packet-switched network, determining whether the second computer has received the most recently modified attack pattern information; and if the second computer has not received the mostly recently modified attack pattern information, transferring the most recently modified attack pattern information from the first computer via a push administration device to the second computer across the packet-switched network.

17. The method of claim 16, the determining comprising comparing attack pattern information on the second computer with an attack pattern update database contained on the first computer.

18. The method of claim 16, further comprising, subsequent to the transferring said most recently updated attack pattern information, updating said attack pattern update database with the identity of said most recently updated attack pattern information transferred to the second computer.

19. The computer program product of claim 1, wherein the modified attack pattern information comprises one or more attack signature files.

20. The computer program product of claim 19, wherein each of the one or more attack signature files contains packet information which corresponds to attack characteristics.

21. The computer program product of claim 19, wherein each of the one or more attack signature files contains protocol information identifying a protocol associated with an attack.

22. The computer program product of claim 19, wherein the one or more attack signature files are contained in a dynamic linked library.

* * * * *